United States Patent [19]

Mayer

[11] Patent Number: 5,633,037
[45] Date of Patent: May 27, 1997

[54] MULTICOAT REFINISHING PROCESS

[75] Inventor: Bernd Mayer, Münster, Germany

[73] Assignee: BASF Lacke + Farben, AG, Muenster-Hiltrup, Germany

[21] Appl. No.: 956,765

[22] PCT Filed: Mar. 6, 1991

[86] PCT No.: PCT/EP91/00416

§ 371 Date: Apr. 22, 1994

§ 102(e) Date: Apr. 22, 1994

[87] PCT Pub. No.: WO91/14513

PCT Pub. Date: Oct. 3, 1991

[30] Foreign Application Priority Data

Mar. 21, 1990 [DE] Germany ............. 40 09 000.0

[51] Int. Cl.$^6$ ............. B32B 35/00; B05D 1/36
[52] U.S. Cl. ............. 427/140; 427/142; 427/409; 427/421
[58] Field of Search ............. 427/140, 142, 427/409, 410, 421, 412.1

[56] References Cited

U.S. PATENT DOCUMENTS

| | | | |
|---|---|---|---|
| 3,953,643 | 4/1976 | Cheung et al. | 427/409 |
| 4,210,565 | 7/1980 | Emmons | 427/393.5 |
| 4,273,690 | 6/1981 | Walus | 427/407.1 |
| 4,539,258 | 9/1985 | Panush | 427/409 |
| 4,716,056 | 12/1987 | Fox | 427/140 |
| 4,731,290 | 3/1988 | Chang | 427/409 |
| 4,861,825 | 8/1989 | Ernst et al. | 524/839 |
| 4,978,708 | 12/1990 | Fowler et al. | 427/409 |
| 4,988,756 | 1/1991 | Den Hartog | 524/517 |
| 5,128,176 | 7/1992 | Schmidt | 427/142 |
| 5,166,272 | 11/1992 | Burks et al. | 106/400 |
| 5,221,584 | 6/1993 | Nickle et al. | 427/405 |
| 5,279,862 | 1/1994 | Corcoran et al. | 427/142 |
| 5,322,715 | 6/1994 | Jouck et al. | 427/409 |
| 5,393,570 | 2/1995 | Schwarte et al. | 427/388.4 |
| 5,413,809 | 5/1995 | Hazan | 427/409 |
| 5,520,955 | 5/1996 | Nawotka | 427/140 |

OTHER PUBLICATIONS

Derwent Abstract 89–329285/45 of JO 1245–882–A, Oct. 1989, Nissan Motor KK.
Derwent Abstract 54098C/31 of JA 0079075, Jun. 1980, Toyo Kogyo KK.

*Primary Examiner*—Diana Dudash
*Attorney, Agent, or Firm*—Anne Gerry Sabourin

[57] ABSTRACT

The subject matter of the present invention is a multicoat metallic refinishing process in which a coating material is first applied to the prepared area of damage and to the adjacent regions of original finish. A metallic basecoat is applied to this first coating in such a way that the basecoat hides the area of damage and tapers off on the coating. A clearcoat is then applied to the basecoat and, if appropriate, also to the adjacent regions of the original finish.

In the process an aqueous metallic basecoat and an aqueous coating material containing a) 5 to 50% by weight, based on the total weight of the coating material, of at least one water-thinnable or water-dispersible film-forming material, b) 0 to 20% by weight, based on the total weight of the coating material, of at least one organic solvent c) conventional auxiliaries and additives, if appropriate, are applied to the prepared area of damage, the dry film thickness of this aqueous coating material being between 2 and 50 μm in the region of the area of damage.

19 Claims, No Drawings

MULTICOAT REFINISHING PROCESS

The subject matter of the present invention is a multicoat refinishing process in which 1.) the area of damage is prepared for the application of a refinish paint system by cleaning, sanding and, if necessary, applying a surfacer and/or body filler,
2.) a coating material is applied to the prepared area of damage and to the adjacent original finish areas,
3.) a polymeric film is formed from the coating material applied in stage (2),
4.) a basecoat composition containing metallic and/or special-effect pigments is applied to the coating obtained in this way at such a film thickness that the basecoat hides the area of damage and tapers off in the adjacent region of the original finish coated with the coating material from stage (2),
5.) a polymeric film is formed from the composition applied in stage (4),
6.) a suitable transparent topcoat composition is applied to the basecoat obtained in this way, if necessary to the parts of the coating from stage (2) not coated with a basecoat and, if necessary, to the adjacent original finish, and then
7.) the topcoat, where appropriate together with the basecoat and where appropriate together with the coating obtained in stage (2) is dried at temperatures between room temperature and 140° C., preferably at temperatures below 100° C. and particularly preferably at temperatures below 80° C.

The repair of areas of damage of a paint finish is usually carried out by thorough cleaning of the area of damage, sanding, if necessary applying a surfacer and applying a refinish body filler to the area of damage. The painting of the area of damage then follows. However, in a panel repair of this kind, differences in shade can often be expected. The repair of metallic paints is particularly difficult, since the shade and brightness of the special effect are highly dependent on the method of working. The width of the spray gunnozzle and the spray pressure, inter alia, play a crucial role here. The method of thinning and the spray viscosity likewise influence shade and special effect.

If in a panel repair of this kind shade differences are to be expected and the area is not demarcated by decorative trim or edges, it may be expedient and economical to compensate the shade differences by a blend-in of the adjacent area using the so-called tapering-off technique.

As described in Chapter 7 "Automotive Refinishing" of the Glasurit Handbook "Pigments and Paints", 11th Edition, Curt R. Vincentz Verlag Hanover 1984, in the case of metallic multicoat finishes the repair area and the adjacent parts are resprayed for this purpose with a conventional, i.e. solvent-borne, highly thinned clearcoat after the preparative work described above, such as cleaning, sanding, surfacing, etc. It is important that this clearcoat is also sprayed on to the repair area, i.e. the body filler patches. Customary conventional clearcoats, for example 2-component clearcoats based on hydroxyl-containing acrylate copolymers as binders and isocyanates as crosslinking agents, are used as the clearcoat for this purpose.

After the clearcoat coating produced in this way has been surface-dried at room temperature or a slightly elevated temperature, the area of damage is resprayed with special-effect paints, such as metallic basecoats, in such a way that the paint hides the area of damage and tapers off into the adjacent areas, i.e. from the edge of the area of damage outwards the film thickness gradually diminishes to 0 μm. If desired, the edge zone can in the case of difficult colors be resprayed using lower spray pressure. Low-solid conventional special-effect paints are usually employed for this repair of the area of damage.

After the basecoat coating produced in this way has been surface-dried, the refinish area and the adjacent parts are completely resprayed with the clearcoat described above and are dried together with the coats applied before-hand at temperatures preferably between room temperature and 100° C., after a flash-off time which may or may not be necessary. Since the metallic basecoats used in this process contain an extremely high proportion of up to 90% of organic solvents, the use of aqueous basecoats is desirable for reasons of economy and to improve work safety (fire protection) and reduce environmental pollution. In particular, when the known aqueous basecoats are applied directly, for this purpose, to an aqueous refinish body filler, the areas of damage cannot be repaired satisfactorily, since this gives rise to shade changes and special effect variations in the region of the area of damage. Repair of the areas of damage using the blend-in spraying technique described above is likewise not satisfactorily possible. This is due to the fact that the required tapering-off spraying into the adjacent part regularly leads to an altered orientation of the effect-producing pigments and hence to shade changes and a poor metallic effect in the edge zones (for example at the transition region between the special-effect basecoat and the clearcoat), thus again making the refinish area distinctly visible.

Furthermore, EP-B-104,779 discloses a process for the refinishing of soft plastic substrates, in which an aqueous polyurethane coating composition is applied to the plastic surface coated with repair material and is dried, and subsequently in a further step conventional, i.e. solvent-borne, pigmented coating materials are applied. The aqueous polyurethane coating composition provides a solvent barrier coat which is intended to prevent the damage, such as blistering, caused by attack by the solvents contained in the pigmented coating materials.

EP-B-10,007 discloses a process for the refinishing of automotive bodies, in which a solvent barrier coat is likewise first applied to the substrate, the protective coat is dried and solvent-borne automotive refinish paints are then applied. The barrier coat is produced by applying an alcoholic or aqueous-alcoholic solution of a polyamide resin. As in the EP-B-104,779 process, this barrier coat is intended to prevent attack on the substrate by the solvents contained in the automotive refinish paints applied subsequently.

Finally, EP-A-320,552 discloses a process for the production of a multicoat paint system, in which an aqueous coating composition, preferably containing metallic pigments, is first applied to the body-filled substrate end dried, after which a conventional aqueous basecoat is applied, followed by a clearcoat. Application of the aqueous coating composition prior to the basecoat/clearcoat coating is intended to achieve, on homogeneous substrates, en enhancement of the metallic effect, in particular an enhancement of the surface brightness, especially in the case of the original finish. On the other hand, the problems of shade changes at the edge zones in the case of refinish coatings are not described.

The object of the present invention is to provide a process for the production of a multicoat refinish paint system which process allows areas of damage to a multicoat metallic finish to be repaired in such a way that the area of repair is as little visible as possible, if at all, i.e. that shade changes, clouding and other blemishes at the edge zones (i.e. the refinish body filler/original finish transition region and the basecoat/clearcoat transition region) are avoided. In addition, there should be good adhesion between the original finish, or the materials employed for the repair of the area of damage, and the basecoat coating. Above all, however, for reasons of economy, to reduce environmental pollution during the drying of the coatings and for reasons of work safety (fire protection), these requirements should be guaranteed to be met even when aqueous or water-thinnable basecoats are employed.

Surprisingly, this object is achieved by the process outlined at the outset, wherein I.) an aqueous coating material, containing
  a) 5 to 50% by weight, based on the total weight of the coating material, of at least one water-thinnable or water-dispersible film-forming material,
  b) 0 to 20% by weight, based on the total weight of the coating material, of at least one organic solvent and
  c) conventional auxiliaries and additives, if appropriate, is applied in stage (2), the dry film thickness of this aqueous coating material being between 2 and 50 µm the region of the area of damage, and II.) an aqueous basecoat composition is applied in stage (4).

Surprisingly, areas of damage to a multicoat metallic finish can be repaired using the process according to the invention in such a way that the refinished area is only barely visible, if at all. In particular, the effects at the edge zone, such as shade changes, clouding and others, frequently observed with the conventional refinish processes are avoided. These problems arise neither at the transition region between the area of damage treated, if appropriate, with a body filler or surfacer and the area of the adjacent original finish, nor at the transition region between the freshly applied refinish metallic basecoat and the original finish. Of crucial importance is the fact that these outstanding results can be achieved using aqueous refinish metallic basecoats, so that above all the environmental pollution arising during the drying of the paint films is kept low. However, the use of aqueous metallic basecoats is highly significant also in respect of aspects of work safety and the economy of this process.

Finally, the process according to the invention guarantees good adhesion between the original finish, or the materials used for the repair of the area of damage, and the basecoat.

The process according to the invention for the production of a multicoat refinish paint system can be employed on a very wide variety of substrates. It is immaterial whether the systems exhibiting areas of damage are conventional or water-thinnable.

In order to carry out the process according to the invention the area of damage is first prepared in the usual way by thorough cleaning, sanding, if necessary surfacing and body-filling. The preliminary work necessary in each case depends on the nature of damage to be repaired and on the required quality of the refinish. It is known (cf. for example Chapter 7 "Automotive Refinishing" of Glasurit Handbook "Pigments and Paints", 11th Edition, Curt R. Vincentz Verlag, Hanover 1984) and therefore need not be elucidated in greater detail here. Both conventional and water-thinnable base materials, such as are usually used, are suitable for this preliminary work.

Water-thinnable base materials are employed increasingly for reasons of economy, and to improve work safety (fire protection) and especially to reduce environmental pollution.

It is an essential part of the invention that an aqueous or water-thinnable coating material is applied to the appropriately prepared area of damage and, in addition, to the adjacent areas of the original finish. This coating material is applied in the region of the area of damage with a dry film thickness of 2 to 50 µm, preferably 5 to 20 µm. On the other hand, in the adjacent areas of the original finish the dry film thickness of this coating material diminishes gradually outwards from the edge of the area of damage to 0 µm. This type of coating with diminishing film thickness is usually referred to as the tapering-off technique. For simplicity's sake this designation is also used below for the application of coatings at a film thickness which gradually diminishes to 0 µm. The region of the adjacent original finish which is coated with this coating material using the tapering-off technique depends on many factors, for example the spray gun used, the spraying pressure, the nature, size and position of the area of damage and similar. The application of the coating material using the tapering-off technique usually takes place in a region of the original finish between 1 cm and 1 m wide around the area of damage. However, the optimum area of the original finish to be coated in each case may be readily determined by a person skilled in the art by means of a few routine experiments.

In addition to this variant of applying the coating material by the tapering-off spray technique it is also possible to apply this coating material to the area of damage and to the entire adjacent region of the original finish until a boundary is reached, for example an edge or a trim, at a dry film thickness of 2 to 50 µm, preferably 5 to 20 µm. This is of significance for those metallic colors which normally create problems, for example on account of a low hiding power of the basecoats. It is then particularly advantageous for the coating material to contain coloring pigments which allow an improved shade match with the original finish.

The aqueous or water-thinnable coating materials used in the process according to the invention contain at least one water-thinnable or water-dispersible binder, preferably in amounts from 5 to 50% by weight, particularly preferably in amounts from 10 to 30%, in each case based on the total weight of the coating material. These binders can be chosen, for example, from the group of acrylate, polyurethane and/or polyester resins. If appropriate, they can be modified by functional groups which control the properties of the resins in a particular direction and/or are suitable for crosslinking of the resins using curing agents. The curing agents can be added to the aqueous or water-thinnable coating material under discussion, but they can also be contained in the basecoat and/or in the final clearcoat coating.

Suitable binders for these aqueous or water-thinnable coating materials are, for example, the polyurethane resins described in DE-OS 3,545,618, DE-OS 3,739,332, U.S. Pat. No. 4,719,132, EP-A-89,497, DE-OS 3,210,051, DE-OS 2,624,442, U.S. Pat. Nos. 4,558,090, 4,489,135, EP-A-38, 127, DE-OS 3,628,124, EP-A-158,099, DE-OS 2,926,584, EP-A-195,931 and DE-OS 3,321,180.

The water-thinnable polyurethane resins containing urea groups preferably employed are those which have a number average molecular weight (determined by gel permeation chromatography using polystyrene as standard) of 1000 to 25,000, preferably 1500 to 20,000, and an acid value of 5 to 70 mg of KOH/g, preferably 10 to 30 mg of KOH/g, and can be prepared by a reaction, preferably a chain extension, of prepolymers containing isocyanate groups with polyamines and/or hydrazine.

The preparation of the prepolymers containing isocyanate groups takes place by reacting polyalcohols having a hydroxyl value of 10 to 1800, preferably 50 to 500, mg of KOH/g with excess polyisocyanates in organic solvents which cannot react with isocyanates, at temperatures of up to 150° C., preferably 50° to 130° C. The equivalence ratio of NCO groups to OH groups is between 1.5 to 1.0 and 1.0 to 1.0, preferably between 1.4 and 1.2 to 1. The polyols used for the preparation of the prepolymers may be low-molecular and/or high-molecular and they may contain slow-reacting anionic groups. In order to increase the hardness of the polyurethane, low-molecular polyols may be used. They have a molecular weight of 60 to about 400 and may contain aliphatic, alicyclic or aromatic groups. Amounts of up to 30% by weight, preferably about 2 to 20% by weight, of the total polyol components are used. The low-molecular polyols containing up to about 20 carbon atoms per molecule, such as ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, di(trimethylolpropane)ether, pentaerythritol, 1,2-cyclohexanediol, 1,4-cyclohexanedimethanol, bisphenol A, bisphenol F, neopentyl glycol, neopentyl glycol ester of hydroxypivalic acid, hydroxethylated or hydroxypropylated bisphenol A, hydrogenated bisphenol A and mixtures thereof are advantageous. In order to obtain an NCO prepolymer of high flexibility, a high proportion of a predominantly linear polyol having a preferred hydroxyl value of 30 to 150 mg of KOH/g should be added. Up to 97% by weight of the total polyol may consist of saturated and unsaturated polyesters and/or polyethers of a molecular weight Mn of 400 to 5000. Suitable high-molecular polyols are aliphatic polyether diols of the general formula H—(—O—(—CHR)$_n$—)$_m$—OH, in which R is hydrogen or a low alkyl radical, unsubstituted or substituted with various substituents, n being 2 to 6, preferably 3 to 4 and m being 2 to 100, preferably 5 to 50. Examples are linear or branched polyether diols, such as poly(oxyethylene) glycols, poly(oxypropylene) glycols and/or poly(oxybutylene) glycols. The chosen polyether diols should not introduce excessive amounts of ether groups, since otherwise the polymers formed swell in water. The preferred polyether diols are poly(oxypropylene) glycols of a molecular weight range Mn of 400 to 3000. Polyester diols are prepared by esterification of organic dicarboxylic acids or their anhydrides with organic diols or are derived from a hydroxycarboxylic acid or a lactone. To prepare branched polyether polyols, it is possible to use to a small extent polyols or polycarboxylic acids of a higher valency. The dicarboxylic acids and diols may be linear or branched aliphatic, cycloaliphatic or aromatic dicarboxylic acids or diols. The diols used for the preparation of the polyesters consist, for example, of alkylene glycols such as ethylene glycol, propylene glycol, butylene glycol, 1,4-butanediol, 1,6-hexanediol, neopentyl glycol and other diols such as dimethylolcyclohexane. The acid component of the polyester consists first of all of low-molecular dicarboxylic acids or their anhydrides containing 2 to 30, preferably 4 to 18, carbon atoms per molecule. Examples of suitable acids are o-phthalic acid, isophthalic acid, terephthalic acid, tetrahydrophthalic acid, cyclohexanedicarboxylic acid, succinic acid, adipic acid, azelaic acid, sebacic acid, maleic acid, fumaric acid, glutaric acid, hexachloroheptanedicarboxylic acid, tetrachlorophthalic acid and/or dimerized fatty acids. Instead of these acids their anhydrides may be used, where these exist. Smaller amounts of carboxylic acids containing 3 or more carboxyl groups, for example trimellitic anhydride or the adduct of maleic anhydride and unsaturated fatty acids, may also be present in the formation of polyester polyols. Polyester diols which are obtained by reacting a lactone with a diol are also used according to the invention. They are distinguished by the presence of a terminal hydroxyl group and recurring polyester moieties of the formula —(—CO—(CHR)$_n$—CH$_2$—O—)—, in which n is preferably 4 to 6 and the substituent R is hydrogen or an alkyl, cycloalkyl or alkoxy radical. No substituent contains more than 12 carbon atoms. The total number of carbon atoms in the substituents does not exceed 12 per lactone ring. Corresponding examples are hydroxycaproic acid, hydroxybutyric acid, hydroxydecanoic acid and/or hydroxystearic acid.

The lactone used as starting material can be represented by the following general formula

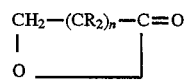

in which n and R have the meanings already defined. The unsubstituted ε-caprolactone, in which n is 4 and all the R substituents are hydrogen, is preferred for the preparation of the polyester diols. The reaction with lactone is initiated by low-molecular polyols, such as ethylene glycol, 1,3-propanediol, 1,4-butanediol and dimethylolcyclohexane. However, other reaction components, such as ethylenediumine, alkyldialkanolamines or even urea may also be reacted with caprolactone.

Suitable high-molecular diols are also polylactam diols which are prepared by the reaction of, for example, ε-caprolactam with low-molecular diols. Aliphatic, cycloaliphatic and/or aromatic polyisocyanates containing at least two isocyanate groups per molecule are used as typical multifunctional isocyanates. The isomers or isomeric mixtures of organic diisocyanates are preferred. Suitable aromatic diisocyanates are phenylene diisocyanate, tolylene diisocyanate, xylylene diisocyanate, biphenylene diisocyanate, naphthylene diisocyanate and diphenylmethane diisocyanate.

(Cyclo)aliphatic diisocyanates furnish products with low tendency to yellowing owing to their good resistance to ultraviolet light. Corresponding examples are isophorone diisocyanate, cyclopentylene diisocyanate and the hydrogenation products of aromatic diisocyanates, such as cyclohexylene diisocyanate, methylcyclohexylene diisocyanate and dicyclohexylmethane diisocyanate. Examples of suitable aliphatic diisocyanates are trimethylene diisocyanate, tetramethylene diisocyanate, pentamethylene diisocyanate, hexamethylene diisocyanate, propylene diisocyanate, ethylethylene diisocyanate, dimethylethylene diisocyanate, methyltrimethylene diisocyanate and trimethylhexane diisocyanate. Particularly preferred diisocyanates are isophorone diisocyanate and dicyclohexylmethane diisocyanate.

The polyisocyanate component employed for the formation of the prepolymer may also contain a proportion of higher-valent polyisocyanates, provided this does not engender gel formation. Products which are formed by trimerization or oligomerization of diisocyanates or by reaction of diisocyanates with polyfunctional compounds containing OH or NH groups have been found to be suitable triisocyanates. The biuret of hexamethylene diisocyanate and water, the isocyanurate of hexamethylene diisocyanate or the adduct of isophorone diisocyanate and trimethylolpropane, for example, belong to this group.

The average functionality can be reduced, if desired, by the addition of monoisocyanates. Examples of such chain-terminating monoisocyanates are phenyl isocyanate, cyclohexyl isocyanate and stearyl isocyanate. Polyurethanes are generally incompatible with water, unless special constituents are incorporated in their synthesis and/or special preparative steps are taken. Thus an acid value is incorporated which is high enough for the neutralized product to be dispersible in water to yield a stable dispersion. Compounds suitable for this purpose are those containing two H-active groups reactive with isocyanates and at least one group capable of anion formation. Suitable groups reactive with isocyanate groups are in particular hydroxyl groups and primary and/or secondary amino groups. Groups capable of anion formation are carboxyl, sulfonic acid and/or phosphonic acid groups. Carboxylic acid groups or carboxylate groups are preferred. Their reactivity should be so low that the isocyanate groups of the diisocyanate preferably react with the other groups of the molecule reactive toward isocyanate groups. Alkanoic acids containing two substituents on the carbon atoms in the α position are used for this purpose. The substituent may be a hydroxyl group, an alkyl group or an alkylol group. These polyols comprise at least one, generally 1 to 3 carboxyl groups in the molecule. They have two to about 25, preferably 3 to 10, carbon atoms. Examples of such compounds are dihydroxypropionic acid, dihydroxysuccinic acid and dihydroxybenzoic acid. A group of dihydroxyalkanoic acids which is particularly preferred are the α,α-dimethylolalkanoic acids which are characterized by the structural formula $RC(CH_2OH)_2COOH$, in which R is hydrogen or an alkyl group containing up to about 20 carbon atoms. Examples of such compounds are 2,2-dimethylolacetic acid, 2,2-dimethylolpropionic acid, 2,2-dimethylolbutyric acid and 2,2-dimethylolpentanoic acid. The preferred dihydroxyalkanoic acid is 2,2-dimethylolpropionic acid. Examples of compounds containing amino groups are diaminovaleric acid, 3,4-diaminobenzoic acid, 2,4-diaminotoluenesulfonic acid and 2,4-diaminodiphenyl ether sulfonic acid. The polyol containing carboxyl groups may amount to 3 to 100% by weight, preferably 5 to 50% by weight, of the total polyol content in the NCO prepolymer. The amount of ionizable carboxyl groups available as salt by neutralization of the carboxyl groups is generally at least 0.4% by weight, preferably at least 0.7% by weight, based on the solid. The upper limit is about 6% by weight. The amount of dihydroxyalkanoic acids in the non-neutralized prepolymers furnish an acid value of at least 5, preferably at least 10. The upper limit for the acid value is about 70, preferably about 40 mg of KOH/g, based on the solid.

This dihydroxyalkanoic acid is advantageously at least partially neutralized with a tertiary amine prior to the reaction with isocyanates in order to prevent a reaction with the isocyanates.

The NCO prepolymers used according to the invention may be prepared by a simultaneous reaction of the polyol or polyol mixture with an excess of diisocyanate. Alternatively, the reaction may also take place in the prescribed sequence in stages. Examples are described in DE-OS 2,624,442 AND DE-OS 3,210,051. The reaction temperature is up to 150° C., a temperature in the region from 50° to 130° C. being preferred. The reaction is allowed to proceed until virtually all hydroxyl functions have reacted.

The NCO prepolymer contains at least about 0.5% by weight of isocyanate groups, preferably at least 1% by weight of NCO, based on the solid. The upper limit is about 15% by weight, preferably 10% by weight, particularly preferably about 5% by weight.

The reaction may be carried out, if appropriate, in the presence of a catalyst, such as organotin compounds and/or tertiary amines. In order to keep the coreactants in a liquid state and allow better temperature control during the reaction, organic solvents which are free of active hydrogen according to Zerewitinoff may be added. Examples of suitable solvents are dimethylformamide, esters, ethers such as diethylene glycol dimethyl ether, ketoesters, ketones such as methyl ethyl ketone and acetone, ketones substituted by methoxy groups, such as methoxyhexanone, glycol ether esters, chlorinatedhydrocarbons, aliphatic and alicyclic hydrocarbon pyrrolidones, such as N-methylpyrrolidone, hydrogenated furans, aromatic hydrocarbons and mixtures thereof. The amount of solvents can fluctuate within wide limits and should be sufficient to allow the formation of a prepolymer solution of suitable viscosity. In most cases 0.01 to 15% by weight of solvent, preferably 0.02 to 8% by weight of solvent, based on the solid, is sufficient. If the solvents, whether water-soluble or water-insoluble, have a boiling point lower than that of water, they may be carefuly distilled off by vacuum-distillation or by thin-layer evaporation subsequent to the preparation of the urea-containing polyurethane dispersion. Higher-boiling solvents should be water-soluble, and remain in the aqueous polyurethane dispersion to facilitate the coalescence of the polymer particles during film formation. N-methylpyrrolidone, possibly in a mixture with ketones such as methyl ethyl ketone, is particularly preferred as a solvent.

The anionic groups of the NCO prepolymer are neutralized at least partially with a tertiary amine. The increase in water dispersibility produced by this means is sufficient to provide for an infinite thinnability. It is also sufficient to disperse the neutralized polyurethane containing urea groups to form a stable dispersion. Examples of suitable tertiary amines are trimethylamine, triethylamine, dimethylethylamine, diethylmethylamine and N-methylmorpholine. The NCO prepolymer is thinned with water after neutralization and then yields a fine dispersion. Shortly afterwards the isocyanate groups which are still present are reacted with dimmines and/or polyamines containing primary and/or secondary amino groups as chain extenders. This reaction leads to a further union and to an increase in molecular weight. To achieve optimum properties, the competing reaction between amine and water with the isocyanate must be well regulated (duration, temperature, concentration) and well supervised to achieve reproducible production. Water-soluble compounds are preferred as chain extenders, because they increase the dispersibility of the polymeric end product in water. Hydrazine and organic dimmines are preferred, because they usually form the highest molecular weight without causing the resin to gel. It is assumed, of course, that the ratio of the amino groups to the isocyanate groups has been chosen appropriately. The amount of the chain extender is determined by its functionality, by the NCO content of the prepolymer and by reaction time. The ratio of the active hydrogen atoms in the chain extender to the NCO groups in the prepolymer should usually be less than 2:1 and preferably in the range of 1.0:1 to 1.75:1. The presence of excess active hydrogen, especially in the form of primary amino groups, may lead to polymers with undesirably low molecular mass.

The polyamines are essentially alkylene polymmines of 1 to 40 carbon atoms, preferably about 2 to 15 carbon atoms. They can carry substituents which contain no hydrogen atoms capable of reacting with isocyanate groups. Examples of these are polyamines having a linear or branched aliphatic, cycloaliphatic or aromatic structure and at least two primary amino groups. Suitable diamines are ethylenediamine, propylenediamine, 1,4-butylenediamine, piperazine, 1,4-cyclohexyldimethylamine, 1,6-hexamethylenediamine, trimethylhexamethylenediamine, methanediamine, isophoronediamine, 4,4'-diaminodicyclohexylmethane and aminoethylethanolamine. Preferred diamines are alkyldiamines or cycloalkyldiamines such as propylenediamine and 1-amino-3-aminomethyl-3,5,5-trimethylcyclohexane. The chain extension can be carried out at least partially using a polyamine which contains at least three amine groups having a reactive hydrogen. This type of polyamine may be used in such an amount that after the extension of the polymer unreacted aminic nitrogen atoms having 1 or 2 reactive hydrogen atoms are present. Such suitable polyamines are diethylenetriamine, triethylenetetramine, dipropylenetriamine and dibutylenetriamine. Preferred polyamines are the alkyltriamines or cycloalkyltriamines, such as diethylenetriamine. To prevent gel formation in the chain extension, small amounts of monoamines, such as ethylhexylamine, may also be added.

The water-thinnable polyurethane resins to be used according to the invention and the preparation thereof are also described in EP-A-89,497 and U.S. Pat. No. 4,719,132. However, other known water-thinnable or water-dispersible polyurethane resins which are obtained, for example, by reacting the prepolymers containing isocyanate groups and described above with triols and/or polyols instead of polyamines are also suitable binders. Such water-thinnable polyurethane resins and the preparation thereof are described, for example, in U.S. Pat. No. 4,423,179 and DE-OS 3,739,322.

Examples of polyols containing at least three hydroxyl groups are trimethylolpropane, glycerol, erythritol, mesoerythritol, arabitol, adonitol, etc. Trimethylolpropane is used for preference. The reaction of the prepolymer with the triols and/or polyols is preferably controlled by the stoichiometry of the compounds employed, in such a way that chain extensions occur.

The water-thinnable coating materials to be used according to the invention employ particularly advantageously as binder a water-thinnable emulsion polymer which can be obtained by (a) polymerizing in a first stage 10 to 90 parts by weight of an ethylenicallyunsaturated monomer or of a mixture of ethylenically unsaturated monomers in aqueous phase in the presence of one or more emulsifiers and one or more radical-forming initiators, the ethylenicallyunsaturated monomer or the mixture of ethylenically unsaturated monomers being chosen so that in the first stage a polymer is obtained having a glass transition temperature ($T_{G1}$) of +30° to +110° C. and, (b) after at least 80% by weight of the ethylenically unsaturated monomer or monomer mixture used in the first stage have reacted, polymerizing in a second stage 90 to 10 parts by weight of an ethylenically unsaturated monomer or of a mixture of ethylenically unsaturated monomers in the presence of the polymer obtained in the first stage, the monomer used in the second stage or the mixture of ethylenically unsaturated monomers used in the second stage being chosen so that a sole polymerization of the monomer used in the second stage or of the mixture of ethylenically unsaturated monomers used in the second stage furnishes a polymer having a glass transition temperature ($T_{G2}$) of −60° to +20° C., and the reaction conditions being chosen so that the resultant emulsion polymer has a number average molecular weight of 200,000 to 2,000,000, and the type and amount of the ethylenically unsaturated monomer or mixture of monomers used in the first stage and those of the ethylenically unsaturated monomer or mixture of monomers used in the second stage being chosen so that the resultant emulsion polymer has a hydroxyl value of 2 to 100 mg of KOH/g and the difference $T_{G1}-T_{G2}$ is 10° to 170° C.

The water-thinnable emulsion polymers used according to the invention can be prepared by a two-stage emulsion polymerization in an aqueous medium in known equipments, for example in a stirred reaction vessel fitted with heating and cooling facilities. The addition of the monomers can be carried out in such a way that a solution consisting of the total water, the emulsifier and some of the initiator is introduced into the reaction vessel and the monomer or mixture of monomers and, separately but at the same time, the remainder of the initiator are slowly added at the temperature of polymerization. It is also possible, however, to charge the reaction vessel with some of the water and emulsifier and to prepare from the remainder of the water and emulsifier and from the monomer or mixture of monomers a pre-emulsion which is slowly added at the temperature of polymerization, the initiator again being added separately.

It is preferred in the first stage to add the monomer or mixture of monomers in the form of a pre-emulsion and in the second stage to add the monomer or mixture of monomers as such, i.e. without water and emulsifier, and to add the initiator separately but at the same time. It is particularly preferred in the first stage to prepare first a seed polymer from some (usually about 30% by weight of the total of the pre-emulsion to be used) of the pre-emulsion to he used in the first stage and then add the remainder of the pre-emulsion to be used in the first stage.

The polymerization temperature is generally in the range from 20° to 100° C., preferably 40° to 90° C.

The proportions between the amount of monomers and the amount of water can be chosen so that the resultant dispersion has a solids content of 30 to 60% by weight, preferably 35 to 50% by weight.

An anionic emulsifier is preferably used, either alone or in a mixture.

Examples of anionic emulsifiers are the alkali metal salts of sulfuric acid hemiesters of alkylphenols or alcohols, and also the sulfuric acid hemiesters of oxethylated alkylphenols or oxethylated alcohols, preferably the alkali metal salts of the sulfuric acid hemiester of a nonylphenol, alkylsulfonate or arylsulfonate which has been reacted with 4–5 mol of ethylene oxide per mol, sodium lauryl sulfate, sodium lauryl ethoxylate sulfate and secondary sodium alkanesulfonates whose carbon chain contains 8–20 carbon atoms. The amount of the anionic emulsifier is 0.1–5.0% by weight, based on the monomers, preferably 0.5–3.0% by weight. Furthermore, to raise the stability of the aqueous dispersions, a non-ionic emulsifier of an ethoxylated alkylphenol or fatty alcohol, for example an addition product of 1 mol of nonylphenol and 4–30 mol of ethylene oxide in a mixture with the anionic emulsifier, may be additionally used.

A peroxide compound is preferably used as the free-radical-forming initiator. The initiator is water-soluble or monomer-soluble. A water-soluble initiator is used for preference.

Suitable initiators are the customary inorganic percompounds such as ammonium persulfate, potassium persulfate, ammonium or alkali metal peroxydiphosphate, and organic peroxides such as benzoyl peroxide, organic peresters such as perisopivalate, partly in combination with reducing agents such as sodium disulfite, hydrazine, hydroxylamine and catalytic amounts of an accelerator such as iron, cobalt, cerium and vanadyl salts. Alkali metal or ammonium peroxydisulfates are used for preference. The redox initiator systems, disclosed in EP-A-107,300, may also be used.

In the first stage 10 to 90, preferably 35 to 65, parts by weight of an ethylenically unsaturated monomer or of a mixture of ethylenicallyunsaturated monomers are emulsion polymerized. The monomer or mixture of monomers used in the first stage is chosen so that when polymerization of the monomer or mixture of monomers used in the first stage is allowed to reach completion, a polymer having a glass transition temperature ($T_{G1}$) of +30° C. to 110° C., preferably 60° to 95° C., is obtained. Since the glass transition temperature of emulsion polymers can be approximately calculated from the equation $$\frac{1}{T_G} = \sum_{n=1}^{n=x} \frac{W_n}{T_{Gn}}$$

$T_G$ = glass transition temperature of the copolymer in $K$ $W_n$ = proportion by weight of the $n$th monomer $T_{Gn}$ = glass transition temperature of the homopolymer obtaind from the $n$th monomer $x$ = number of the different monomers, a person skilled in the art has no difficulties in choosing the monomer or mixture of monomers to be used in the first stage in such a way that when polymerization of the monomer or mixture of monomers used in the first stage is allowed to reach completion, a polymer having a glass transition temperature ($T_{G1}$) of +30° to +110° C., preferably 60° to 95° C., is obtained.

Examples of monomers which can be used in the first stage are the following: vinylaromatic hydrocarbons, such as styrene, α-alkylstyrene and vinyltoluene, esters of acrylic acid or methacrylic acid, in particular aliphatic and cycloaliphatic acrylates or methacrylates having up to 20 carbon atoms in the alcohol radical, such as methyl, ethyl, propyl, butyl, hexyl, ethylhexyl, stearyl, lauryl and cyclohexyl acrylate or methacrylate, acrylic and/or methacrylic acid, acrylamide and/or methacrylamide, N-methylolacrylamide and/or N-methylolmethacrylamide, hydroxyalkyl esters of acrylic acid, methacrylic acid or another α,β-ethylenicallyunsaturated carboxylic acid, such as 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate, 4-hydroxybutyl methacrylate etc.

Ethylenicallyunsaturated monomers or mixtures of ethylenically unsaturated monomers which are essentially free from hydroxyl and carboxyl groups are preferably employed in the first stage. The expression "essentially free" is intended to signify that it is preferred to use monomers or monomeric mixtures which are free from hydroxyl and carboxyl groups, but that the monomers or mixtures of monomers used may also comprise small amounts (for example due to impurities) of hydroxyl and/or carboxyl groups. The content of hydroxyl and carboxyl groups should preferably be at most such that a polymer prepared from the monomer or mixture of monomers used in the first stage has an OH value of not more than 5 mg of KOH/g and an acid value of not more than 3 mg of KOH/g.

The first stage employs particularly preferably a mixture consisting of (a1) 100 to 60%, preferably 99.5 to 75%, by weight of a cycloaliphatic or aliphatic ester of methacrylic or acrylic acid or a mixture of such esters and (a2) 0 to 40%, preferably 0.5 to 25%, by weight of a monomer which is copolymerizable with (a1) or a mixture of such monomers, the total weight of (a1) and (a2) being always 100% by weight.

The following, for example, can be used as component (a1): cyclohexyl acrylate, cyclohexyl methacrylate, alkyl acrylates and alkyl methacrylates having up to 20 carbon atoms in the alkyl radical, such as methyl, ethyl, propyl, butyl, hexyl, ethylhexyl, stearyl and lauryl acrylate and methacrylate or mixtures of these monomers.

Vinylaromatic hydrocarbons such as styrene, α-alkylstyrene and vinyltoluene, acrylamide, methacrylamide, acrylonitrile and methacrylonitrile or mixtures of these monomers may be used, for example, as component (a2).

After at least 80% by weight, preferably at least 95% by weight, of the ethylenically unsaturated monomer or mixture of monomers used in the first stage have reacted, 90 to 10, preferably 65 to 35, parts by weight of an ethylenically unsaturated monomer or a mixture of ethylenically unsaturated monomers are emulsion polymerized in a second stage in the presence of the polymer obtained in the first stage, the monomer or mixture of monomers used in the second stage being chosen so that a sole polymerization of the monomer or mixture of monomers used in the second stage furnishes a polymer having a glass transition temperature ($T_{G2}$) of −60° to +20° C., preferably −50° to 0° C. This choice poses no difficulties to a person skilled in the art, since the glass transition temperatures of emulsion polymers—as already stated above—can readily be approximately calculated. It is furthermore an essential part of the invention that the type and amount of the monomer or mixture of monomers used in the first stage and those of the monomer or mixture of monomers used in the second stage are chosen so that the resultant emulsion polymer has a hydroxyl value of 2 to 100 mg of KOH/g, preferably of 10 to 50 mg of KOH/g, and the difference $T_{G1}-T_{G2}$ is 10° to 170° C., preferably 80° to 150° C.

Examples of monomers which can be used in the second stage are the following: vinylaromatic hydrocarbons such as styrene, α-alkylstyrene and vinyltoluene, esters of acrylic or methacrylic acid, in particular aliphatic and cycloaliphatic acrylates or methacrylates having up to 20 carbon atoms in the alcohol radical, such as methyl, ethyl, propyl, butyl, hexyl, ethylhexyl, stearyl, lauryl and cyclohexyl acrylate or methacrylate, acrylic and/or methacrylic acid, acrylamide and/or methacrylamide, N-methylolacrylamide and/or N-methylolmethacrylamide, hydroxyalkyl esters of acrylic acid, methacrylic acid or another α,β-ethylenicallyunsaturated carboxylic acid, such as 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate, 4-hydroxybutyl methacrylate, etc.

The second stage employs preferably a mixture consisting of (b1) 47 to 99, preferably 75 to 90, % by weight of a cycloaliphatic or aliphatic ester of methacrylic or acrylic acid or a mixture of such esters, (b2) 1 to 20, preferably 5 to 15, % by weight of a hydroxyl-containing monomer which is copolymerizable with (b1), (b3) and (b4) or a mixture of such monomers, (b3) 0 to 8, preferably 2 to 6, % by weight of a carboxyl- or sulfonic acid-containing monomer which is copolymerizable with (b1), (b2) and (b4) or a mixture of such monomers and (b4) 0 to 25, preferably 2 to 15, % by weight of a further monomer which is copolymerizable with (b1), (b2) and (b3) or a mixture of such monomers, the total weight of (b1), (b2), (b3) and (b4) being always 100% by weight.

Cyclohexyl acrylate, cyclohexyl methacrylate, alkyl acrylates and alkyl methacrylates having up to 20 carbon atoms in the alkyl radical, such as methyl, ethyl, propyl, butyl, hexyl, ethylhexyl, stearyl and lauryl acrylate and methacrylate or mixtures of these monomers may be used, for example, as component (b1).

Hydroxyalkyl esters of acrylic acid, methacrylic acid or another ethylenicallyunsaturated carboxylic acid may be used, for example, as component (b2). These esters may be derived from an alkylene glycol which is esterified with the acid, or they can be obtained by a reaction of the acid with an alkylene oxide. Hydroxyalkyl esters of acrylic and methacrylic acid, in which the hydroxyalkyl group contains up to 4 carbon atoms, or mixtures of these hydroxyalkyl esters, are preferably used as the component (b2). Examples of these hydroxyalkyl esters are 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate or 4-hydroxybutyl methacrylate. Corresponding esters of other unsaturated acids, such as ethacrylic acid, crotonic acid and similar acids having up to about 6 carbon atoms per molecule may also be used.

Acrylic acid and/or methacrylic acid and/or acrylamidoethylpropanesulfonic acid are preferably used as component (b3). However, other ethylenically unsaturated acids having up to 6 carbon atoms in the molecule may also be used. Examples of such acids are ethacrylic acid, crotonic acid, maleic acid, fumaric acid and itaconic acid.

Vinylaromatic hydrocarbons such as styrene, α-alkylstyrene and vinyltoluene, acrylamide, methacrylamide, acrylonitrile and methacrylonitrile or mixtures of these monomers may be used, for example, as component (b4).

The emulsion polymer used according to the invention should have a number average molecular weight (determination by gel permeation chromatography using polystyrene as standard) of 200,000 to 2,000,000, preferably 300,000 to 1,500,000 and, usually, acid values below 100 mg of KOH/g and OH values of 2 to 100 mg of KOH/g. If the emulsion polymer contains no or only very few acid groups (acid value below 3 mg of KOH/g, for example), it is advantageous to add to the coating composition a carboxyl-containing resin, for example a carboxyl-containing polyurethane, polyester or polyacrylate resin. The amounts of the carboxyl-containing resin are to be chosen so that the acid value of the mixture of emulsion polymer and carboxyl-containing resin is 10 mg of KOH/g or greater.

A person skilled in the art knows how he must choose the reaction conditions during the emulsion polymerization so as to obtain emulsion polymers having the number average molecular weights indicated above (cf. for example "Chemistry, Physics and Technology of Plastics in Individual Articles, Dispersions of synthetic high polymers", Part 1 by F. Hölscher, Springer Verlag, Berlin, Heidelberg, N.Y., 1969).

It is finally also possible to use as the film-forming material a mixture consisting of less than 100 to 40% by weight of the emulsion polymer described above and of up to 60% by weight of the polyurethane resin described above, the amounts being in each case based on the solids content and their total always being 100% by weight.

If appropriate, the aqueous coating materials used according to the invention may advantageously contain, besides the emulsion polymer or the mixture of emulsion polymers and polyurethane resin, further compatible water-thinnable resins, such as amino resins, polyesters and polyethers which generally act as grinding resins for the pigments.

The aqueous coating materials used according to the invention may contain, if appropriate, 5 to 20% by weight, based on the total solids content of the coating material, of a water-thinnable amino resin, preferably melamine resin, and 5 to 20% by weight of a water-thinnable polyether (for example polypropylene glycol having a number average molecular weight of 400 to 900).

Any other known water-thinnable or water-dispersible resin, for example based on acrylate copolymers and polyester resins, either alone or in a mixture, may of course be employed in the aqueous coating materials used according to the invention as film-forming material. In addition to the film-forming material, the aqueous or water-thinnable coating materials also contain organic solvents in the usual amounts, preferably 0 to 20% by weight of solvent, based on the total weight of the coating material. Examples of suitable solvents are alcohols, such as butyl glycol, ethoxypropanol, ethanol, propanol, ketones, such as methyl ethyl ketone and methyl isobutyl ketone, and hydrocarbons such as various Solvesso® grades and Solvent Naphtha®.

Moreover, the aqueous coating materials also contain water in customary amounts, preferably 30 to 95% by weight of water, based on the total weight of the coating material.

If appropriate, the aqueous coating materials may also contain further customary auxiliaries and additives in the usual amounts, for example fillers, non-pigmented, transparent fillers such as silicon dioxide, phyllosilicates, barium sulfate and others being preferably used. The fillers are preferably used in amounts of, if appropriate, 0 to 20% by weight, based on the total weight of the coating material. If appropriate, the aqueous coating materials may also contain further customary paint additives in the usual amounts, preferably 0 to 5% by weight, based on the total weight of the coating material. Thus conventional additives for the enhancement of substrate wetting, film formation, adhesion to the substrate, antifoam action and/or rheology control may in particular be added.

The coating materials used according to the invention are preferably employed as clearcoat. Where the coating materials are used to coat a large area of the original finish between boundaries, they may also contain coloring pigments which allow a better shade match. These pigments are preferably used in amounts from 0 to 20% by weight, based on the total weight of the coating material. Examples of suitable coloring pigments are inorganic pigments such as titanium dioxide, iron oxide, carbon black, etc., and organic pigments such as phthalocyanine, quinacridone and similar pigments.

However, the aqueous coating materials contain no metallic pigments and no non-metallic special-effect pigments.

In a second stage an aqueous coating composition is applied to this first coating after formation of a polymeric film, preferably after previous drying of this first coating at temperatures between room temperature and 140° C., preferably at temperatures below 80° C., during a period of 5 to 60 min. and, if appropriate, after a brief cooling period of up to 10 min. In this operation this aqueous or water-thinnable basecoat composition is applied to the area of damage in such a way that it hides the latter, i.e. no shade difference is noticeable between the coating and the substrate, and is applied to the adjacent area, presprayed with the aqueous coating material described above, by the tapering-off spray technique, i.e. its film thickness diminishes from the edge of the area of damage in the direction of the outer edge. Overlapping of the original finish, i.e. applying the basecoat beyond the region of the first coating, must be avoided in order to avoid marking the region of the edge zone by altered orientation of the metallic pigment. If in the first stage of the process the total part area has been coated with the aqueous coating material, then the total part area can also be hidingly coated with the basecoat. The dry film thickness of the basecoat is generally between 5 and 50 µm in the region of the area of damage.

Any aqueous basecoat composition which is curable at low temperatures, generally from room temperature to about 140° C., preferably at temperatures below 80° C., is suitable for use in the process according to the invention. Aqueous basecoat compositions which contain as the film-forming material the emulsion polymer described above, preparable by the two-stage emulsion polymerization process likewise already described, are particularly preferred. For details regarding the properties and preparation of this emulsion polymer reference is therefore made only to pages 23 to 34 of the present description. This emulsion polymer is usually employed in the basecoat compositions in amounts of 5 to 50% by weight, preferably of 5 to 25% by weight, based in each case on the total weight of the basecoat composition.

It is also possible to use as the film-forming material in the basecoat compositions the water-thinnable or water-dispersible polyurethane resins likewise already described. For details concerning the properties and preparation of these polyurethane resins reference should be made to pages 11 to 23 of the present description. These polyurethane resins are usually employed in the basecoat compositions in amounts of 1 to 40% by weight, preferably of 3 to 25% by weight, based on the total weight of the basecoat composition.

The aqueous basecoat compositions may also contain as the film-forming material a mixture of preferably less than 100 to 40% by weight of the emulsion polymer described above and preferably 9 to 60% by weight of the polyurethane resin described above, the amounts being based in each case on the solids content and their total being always 100% by weight. In addition, the basecoat compositions contain, in each case in the customary amounts, organic solvents, water, conventional auxiliaries and additives if appropriate, coloring pigments and metallic and/or special effect pigments.

The basecoat compositions may contain as pigments coloring inorganic pigments such as titanium dioxide, iron oxide, carbon black, etc., organic coloring pigments and customary metallic pigments (for example commercial aluminum bronzes, stainless steel bronzes . . . ) and non-metallic special-effect pigments (for example nacreous luster or interference pigments). The basecoat compositions preferably contain metallic pigments and/or special-effect pigments. The degree of pigmentation is in the customary ranges, preferably 0 to 10% by weight, based on the total weight of the basecoat composition.

Furthermore, crosslinked polymeric microparticles, such as those disclosed in EP-A-38,127, and/or customary rheological inorganic or organic additives may be added to the basecoat compositions in usual amounts, for example 0.05 to 6% by weight, based on the total weights of the basecoat composition. Thus, examples of thickeners used are inorganic phyllosilicates such as aluminum-magnesium silicates, sodium-magnesium phyllosilicates and sodium-magnesium-fluorine-lithium phyllosilicates of the montmorillonite type, water-soluble cellulose ethers such as hydroxtethyl cellulose, methylcellulose or carhoxymethylcellulose and synthetic polymers comprising ionic and/or associatively acting groups such as polyvinyl alcohol, poly(meth)acrylamide, poly(meth)acrylic acid, polyvinylpyrrolidone, styrene-maleic anhydride or ethylene-maleic anhydride copolymers and derivatives thereof or hydrophobically modified ethoxylated urethanes or polyacrylates. A combination consisting of a carboxyl-containing polyacrylate copolymer having an acid value of 60 to 780, preferably 200 to 500, mg of KOH/g and a sodium-magnesiumphyllosilicate is particularly preferred. Basecoat compositions which are particularly preferred and have improved humidity resistance of the coatings are obtained when when the sodiummagnesium phyllosilicate is used in the form of an aqueous paste. Pastes which are particularly preferred contain either 3% by weight of phyllosilicate and 3% by weight of polypropylene glycol or 2% by weight of phyllosilicate and 2% by weight, based in each case on the total weight of the paste, of other commercial surfactants.

The basecoat compositions generally have a solids content of about 5 to 50% by weight, preferably 10 to 25% by weight.

The coating compositions may in addition contain usual organic solvents. The amount of these should be kept as low as possible. It is, for example, below 15% by weight.

The pH of the basecoat compositions is generally adjusted to between 6.5 and 9.0. The adjustment of the pH may be carried out using conventional amines, such as ammonia, triethylamine, dimethylaminoethanol and N-methylmorpholine.

However, other known basecoat compositions, for example those systems described in GB-A-2,073,609 and EP-A-195,931, are also suitable for use in the process according to the invention.

After the formation of a polymeric film on the basecoat composition, preferably after drying of the basecoat at temperatures from room temperature up to 140° C., preferably at temperatures below 80° C., for a period of 5 to 60 min., and, if appropriate, after a brief cooling period of generally at least 5 minutes, a suitable transparent topcoat composition is applied to the basecoat and—should the whole of the first coat not be provided with a basecoat—to the possibly still uncoated parts of the first coat. The topcoat composition is preferably applied so as to taper off into the uncoated region of the original finish or to the whole of the adjacent original finish up to an edge, decorative trim or similar in such a way that the original finish is hidden, since in this way time-consuming polishing work is eliminated. The dry film thickness of the topcoat is generally between 30 and 100 µm. 1- or 2-component clearcoats, both organic solvent-borne and aqueous, are suitable as the topcoat composition. Clearcoats based on a hydroxyl-containing acrylate copolymer and a blocked polyisocyanate are frequently used. Such clearcoats are disclosed, for example, in the patent applications DE 3,412,534, DE 3,609,519, DE 3,731, 652 and DE 3,823,005. The moisture-curing clearcoats based on polyaddition polymers containing alkoxysilane or acryloxysilane units described in the international patent application with the international publication number WO88/02010 are likewise suitable. After a flash-off time of about 5 minutes, if necessary, the topcoat, where appropriate together with the basecoat and where appropriate together with the coating obtained in stage (2) is dried at temperatures between room temperature and 140° C., preferably at temperatures below 80° C., for a period of 5 to 120 min.

The invention is explained in greater detail in the examples below. All parts and percentages are by weight, unless expressly stated otherwise. A multicoat original finish, such as is customary in automotive production line painting, is used as the substrate. It is unimportant whether the finishes are conventionally based or based on water-thinnable systems.

1. Simulation of an area of damage
1.1 Simulation of an area of damage 1

A steel panel, primed by the electro-dipping process, which is furnished with a commercial conventional body filler based on a melamine-crosslinked polyester resin (FC 60-7133 from BASF Lacke +Farben AG, Münster; dry film thickness 40 µm), a commercial conventional metallic basecoat based on cellulose acetobutyrate (AE 54-9153 from BASF Lacke+Farben AG, Münster; dry film thickness 15 µm) and a commercial conventional clearcoat based on isocyanate-crosslinked hydroxyl-containing acrylates (AF 23-0185 from BASF Lacke+Farben AG; dry film thickness 60 µm), is used as the substrate. After the customary drying (60° C., 30 min.) the coated panel is additional stored for several hours at elevated temperature, for example 60° C., and the finish is thus aged. A refinish area is simulated on this substrate by producing an area with the paint abraded to bare metal (diameter≈5 cm). This abraded area is produced in such a way that the transitions from metal to clearcoat are as flat as possible.

A commercial conventional refinish primer surfacer, based on isocyanate-crosslinked hydroxyl-containing acrylates (AB 85-1122 from BASF Lacke+Farben AG, M ünster; dry film thickness 70 µm) is applied to the area of damage thus produced and is dried by heating at 60° C. for a period of 30 min.

The area of damage and the parts of the original finish adjacent to the area of damage which are also to be painted in the course of the blend-in spray technique (a strip at least 1 cm wide around the area of damage) are sanded down using abrasive paper in such a way that smooth transitions to the original finish are produced.

1.2 Simulation of an area of damage 2

Using a method similar to that used to produce the area of damage 1, a further area of damage 2 is simulated which differs from the area of damage 1 only in that an aqueous refinish body filler based on an acrylate dispersion (AB 76-1986 from BASF Lacke+Farben AG, Münster; dry film thickness 70 µm) is applied to the abraded area produced instead of the conventional refinish body filler, and is dried.

2. Preparation of water-thinnable coating materials
2.1 Coating material 1 based on polyurethane An aqueous coating material 1 is prepared by a method similar to that used in Example 3 of DE-OS 3,210,051, but with the difference that the coating material contains no aluminum pigment and no melamine resin.

As described in DE-OS 3,210,051 for the polyurethane dispersion 3, the polyurethane dispersion used in the coating material 1 is prepared as follows:

500 g of a polypropylene glycol having a hydroxyl value of 112 are freed from water in vacuo at 100° C. for 1 hour. 262 g of 4,4'-dicyclohexylmethane diisocyanate are added at 80° C., and the reaction mixture is stirred at 90° C. until the isocyanate content is 5.47% by weight, based on the total weight.

A solution of 33.5 g of dimethylolpropionic acid and 25 g of triethylamine in 200 g of N-methylpyrrolidone is added to the reaction mixture, cooled to 60° C., which is then stirred for 1 hour at 90° C. The resultant mass is transferred into 1650 g of deionized water with vigorous stirring. 40 g of a 15% hydrazine solution are then added to the resultant dispersion in the course of 20 minutes with stirring. The resultant dispersion has a solids content of 32% and an efflux time of 23 seconds in a DIN Cup No. 4.

As described in DE-OS 3,210,051 the water-soluble polyester used is prepared as follows:

832 parts by weight of neopentyl glycol are introduced into a reaction vessel fitted with a stirrer, a thermometer and a packed column, and are melted. 664 parts by weight of isophthalic acid are added. Heat is applied with stirring at such a rate that the temperature at the head of the column does not exceed 100° C. Esterification is allowed to proceed at a temperature not higher than 220° C., until an acid value of 8.5 is reached. 384 parts by weight of trimellitic anhydride are added to the reaction mixture cooled to 180° C., and esterification is allowed to proceed until an acid value of 39 is reached. The mixture is diluted with 425 parts by weight of butanol.

Using a method similar to that used in DE-OS-3,210,051, the thickener used is prepared as follows:

A 3% paste of a sodium-magnesium-fluorine-lithium silicate in water: To prepare the paste, the silicate is stirred into water over 30–60 minutes using a dissolver and the mixture is allowed to stand overnight. Next day it is stirred for a further 10 to 15 minutes.

For the preparation of the coating material 1, 25 parts of the thickener described above are added with stirring to 25 parts of the polyurethane dispersion (32% solids) described above using a method similar to that used in Example 3 of DE-OS 3,210,051. 5 parts of the polyester resin (80% solids) described above, 0.5 parts of dimethylethanolamine (10% solution in water), 5 parts of butyl glycol and 32.5 parts of water are added with further stirring. After the mixture has been stirred for 30 minutes, its viscosity is adjusted with water to an efflux time of 16 to 25 seconds in a DIN No. 4 cup.

2.2 Coating material 2 based on polyurethane

An aqueous coating material 2 is prepared using a method similar to that used in Example 5 of DE-OS 3,210,051, but with the difference that the coating material contains no aluminum pigment and no melamine resin.

The polyurethane dispersion used in the coating material 2 is prepared using a method similar to that used for the polyurethane dispersion 5 of DE-OS 3,210,051 as follows:

650 g of a commercial polyether obtained from tetrahydrofuran, having a hydroxyl value of 173, are freed from water in vacuo at 100° C. for 1 hour. 533 g of isophorone diisocyanate are added at 80° C., and the reaction mixture is then stirred at 90° C. until the isocyanate content is 9.88% by weight, based on the total weight. A solution of 93 g of dimethylolpropionic acid and 70 g of triethylamine in 400 g of N-methylpyrrolidone is added to the reaction mixture cooled to 60° C., which is then stirred for 1 hour at 90° C. The resultant polyurethane mass is stirred into 4700 g of cold deionized water with vigorous stirring. 120 g of a 15% hydrazine solution are then added to the resultant dispersion in the course of 20 minutes. The resultant dispersion has a solids content of 19% and an efflux time of 27 seconds in a DIN No. 4 cup.

The acrylate resin used is prepared as follows:

400 parts by weight of n-butanol are introduced into a reaction vessel fitted with a stirrer, thermometer and reflux condenser and are heated to 110° C. A mixture of 1000 parts by weight of n-butyl methacrylate, 580 parts by weight of methyl methacrylate, 175 parts by weight of 2-hydroxyethyl acrylate and 175 parts by weight of acrylic acid is then added from one feed vessel, and a mixture of 80 parts by weight of t-butyl perbenzoate and 80 parts by weight of n-butanol are added from a second feed vessel, the additions being carried out uniformly and simultaneously over a period of 4 hours. The temperature during the addition is kept at 110° C. After the addition, polymerization is allowed to proceed further at 110° C. and after 1 hour a mixture of 10 parts by weight of t-butyl perbenzoate and 10 parts by weight of n-butanol is added. After a further 1.5 hours a polymer solution is obtained which has a solids content of 79.7% by weight, an acid value of 64.0, based on the solids content, and a viscosity of 850 mPas measured in a plate-cone viscometer at a solids content of 60% by weight in n-butanol.

A paste, 3% in water, of a sodium-magnesium phyllosilicate is used as a thickener.

For the preparation of the coating material 2, 30 parts of the polyurethane dispersion (19% solids) described above are added with stirring to 25 parts of the thickener described above using a method similar to that used in Example 5 of DE-OS 3,210,051. 6 parts of the acrylate resin (80% solids) described above, 0.5 part of dimethylethanolamine (10% in water), 5 parts of butyl glycol and 26.5 parts of water are added with further stirring. After the mixture has been stirred for 30 minutes, its viscosity is adjusted with water to an efflux time of 16 to 25 seconds in a DIN No. 4 cup.

2.3 Coating material 3 based on an emulsion polymer

An emulsion polymer dispersion 1 is first prepared as follows:

1344 g of deionized water and 12 g of a 30% aqueous solution of the ammonium salt of penta(ethylene glycol) nonyl phenyl ether sulfate (Fenopon® EP 110 from GAF Corp., emulsifier 1) are introduced into a cylindrical double-walled glass vessel fitted with a stirrer, reflux condenser, stirrable feed vessel, dropping funnel and thermometer, and the mixture is heated to 82° C. In the stirrable feed vessel an emulsion is prepared from 720 g of deionized water, 24 g of emulsifier 1, 10.8 g of acrylamide, 864 g of methyl methacrylate and 216 g of n-butyl methacrylate. 30% by weight of this emulsion is added to the contents of the double-walled flask. 28% by weight of a solution of 3.1 g of ammoniumperoxodisulfate in 188 g of deionized water are then added dropwise in the course of 5 minutes. An exothermic reaction sets in. The reaction temperature is kept between 82° and 88° C. 15 minutes after the addition of the ammonium peroxodisulfate solution has been completed, the remaining 70% by weight of the emulsion together with the remaining 72% by weight of the ammoniumperoxodisulfate solution are added over one hour, the temperature being kept at 85° C. The reaction mixture is then cooled to 82° C. and treated in the course of 2 hours with a mixture of 842 g of n-butyl acrylate, 108 g of hydroxypropyl methacrylate, 43 g of methyl methacrylate, 43.2 g of methacrylic acid, 32.4 g of acrylamide and 5.4 g of eicosa (ethhlene glycol) nonyl phenyl ether (Antarox® CO 850 from GAF Corp., emulsifier 2) and 343 g of deionized water. After the addition is completed, the reaction mixture is allowed to stand at 85° C. for a further 1.5 hours. It is then cooled and the dispersion is passed through a 30 μm mesh fabric. A finely divided dispersion is obtained having a non-volatile content of 45% by weight, a pH of 3.4, an acid value of 13 mg of KOH/g and an OH value of 20 mg of KOH/g.

For the preparation of the coating material 3, the pH of 50 g of the emulsion polymer dispersion 1 is adjusted to 6.9 with ammonia and is treated with 9.4 g of a 3.5% solution of a commercial polyacrylic acid thickener (Viscalex® HV 30 from Allied Colloids, pH 8.0) and with 0.5 g of a commercial antifoam (BYK® 035). The pH of the resultant mixture is adjusted to 7.0 by the addition, if appropriate, of a 25% aqueous ammonia solution. 60 g of a preswelled aqueous paste, containing 2% by weight of an inorganic sodium-magnesium phyllosilicate thickener and 2% by weight, based on the weight of the paste, of polypropylene glycol (number average molecular weight=900) are added to this mixture with stirring. The viscosity is then adjusted to an efflux time of 16–25 seconds in a DIN No. 4 cup by the addition of deionized water.

2.4 Coating material 4 based on an emulsion polymer

An emulsion polymer dispersion 2 is first prepared as follows:

1344 g of deionized water and 12 g of a 40% aqueous solution of the ammonium salt of penta(ethylene glycol) nonyl phenyl ether sulfate (Fenopon® EP 110 from GAF Corp., emulsifier 1) are introduced into a cylindrical double-walled glass vessel fitted with a stirrer, reflux condenser, stirrable feed vessel, dropping funnel and thermometer and are heated to 80° C. An emulsion is prepared in the stirrable feed vessel from 720 g of deionized water, 24 g of emulsifier 1, 10.8 g of acrylamide, 518 g of methyl methacrylate, 292 g of n-butyl methacrylate and 205 g of styrene. 30% by weight of this emulsion are added to the mixture in the double-walled glass vessel. A solution of 0.9 g of ammonium peroxodisulfate (APS) in 55 g of deionized water is added dropwise over 5 minutes. An exothermic reaction sets in. The reaction temperature is kept between 80° and 85° C. 15 minutes after the addition of the above APS solution has been completed, a solution of 2.2 g of APS in 480 g of water is added in the course of 3 hours and the remaining 70% of the above emulsion is added in the course of one hour, the reaction temperature being kept at 80° C. When the addition of the emulsion has been completed, the reaction mixture is cooled to 77° C. and a mixture of 745 g of n-butyl acrylate, 119 g of methyl methacrylate, 108 g of hydroxypropyl methacrylate, 54 g of styrene, 42.7 g of ethylhexyl acrylate, 42.7 g of methacrylic acid, 21.6 g of acrylamide and 2.2 g of emulsifier 2 is added in the course of 2 hours.

When the addition has been completed, the reaction mixture is kept at 80° C. for a further 1.5 hours. It is then cooled and the dispersion is passed through a 30 μm mesh fabric. A fine dispersion is obtained having a non-volatile content of 45% by weight, a pH of 3.8, an acid value of 13 mg of KOH/g and an OH value of 19 mg of KOH/g.

The preparation of coating material 4 is carried out using a method similar to that used for the preparation of coating material 3, with the sole difference that 50 g of the emulsion polymer dispersion 2 is used instead of 50 g of the emulsion polymer dispersion 1.

2.5 Coating material 5 based on polyurethane

First, a polyurethane dispersion 3 is prepared as follows:

686.3 g of a polyester having a number average molecular weight of 1400 based on a commercially available unsaturated dimeric fatty acid (having an iodine number of 10 mg of $I_2$/g, a maximum monomer content of 0.1%, a maximum trimer content of 2%, an acid number of from 195 to 200 mg of KOH/g and a saponification number of from 197 to 202 mg of KOH/g), isophthalic acid and hexanediol are introduced under a protective gas into a suitable reaction vessel fitted with stirrer, reflux condenser and feed vessel, and 10.8 g of hexanediol, 55.9 g of dimethylolpropionic acid, 344.9 g of methyl ethyl ketone and 303.6 g of 4,4'-di (isocyanatocyclohexyl)methane are added one after the other. This mixture is kept under reflux until the isocyanate content has dropped to 1.0%. 26.7 g of trimethylolpropane are subsequently added to the mixture, which is kept under reflux until a viscosity of 12 dPas has been reached (for a partial solution of 1:1=resin solution/N-methylpyrrolidone).

Any excess isocyanate present is destroyed by addition of 47.7 g of buryl glycol. 32.7 g of dimethylethanolamine, 2688.3 g of demineralized water and 193.0 g of butyl glycol are subsequently added to the reaction mixture with vigorous stirring. Removal of the methyl ethyl ketone by vacuum distillation gives a dispersion having a solids content of about 27%.

In order to prepare the coating material 5, 30 parts of the above-described polyurethane dispersion 3 (solids content 27% ) are added with stirring to 25 parts of the above-described thickener. 6 parts of the acrylate resin (solids content 80% ), 0.5 parts of dimethylethanolamine (10% in water), 5 parts of butyl glycol and 26.5 parts of water are added with further stirring. After the mixture has been stirred for 30 minutes, its viscosity is adjusted with water to an efflux time of from 16 to 25 s in a DIN No. 4 cup.

3. Preparation of aqueous basecoat compositions 3.1 Basecoat composition 1

A basecoat composition 1 is prepared as follows using a method similar to that used in Example 3 of DE-OS 3,210,051:

25 parts of the polyurethane dispersion (32% solids) described in 2.1 are added with stirring to 25 parts of the thickener described in 2.1.5 parts of the polyester resin (80% solids) described in 2.1, 0.5 part of dimethylethanolamine (10% solution in water), 2 parts of a commercial methanol-etherified melamine-formaldehyde resin (solids content 70% in water), 5 parts of a commercial aluminum pigment paste (aluminum content 60 to 65%, average particle diameter 10 µm), 5 parts of butyl glycol and 32.5 parts of water are added with further stirring. After the mixture has been stirred for 30 minutes, its viscosity is adjusted with water to an efflux time of 16 to 25 seconds in a DIN No. 4 cup.

3.2 Basecoat composition 2

A basecoat composition 2 is prepared as follows by a method similar to that used in Example 5 of DE-OS 3,210,051:

30 parts of the polyurethane dispersion (19% solids) described in 2.2 are added with stirring to 25 parts of the thickener described in 2.2.6 parts of the acrylate resin (80% solids) described in 2.2, 0.5 part of dimethylethanolamine (10% in water), 2 parts of a commercial methanol-etherified melamine-formaldehyde resin (solids content 70% in water), 5 parts of a commercial aluminum pigment paste (aluminum content 60 to 65%, average particle diameter 10 µm), 5 parts of butyl glycol and 26.5 parts of water are added with further stirring. After the mixture has been stirred for 30 minutes, its viscosity is adjusted with water to an efflux time of 16 to 25 seconds in a DIN No. 4 cup.

3.3 Basecoat composition 3

The basecoat composition 3 is prepared as follows:

8.0 g of butyl glycol and 4.5 g of an aluminum bronze according to DE-OS 3,636,183 (aluminum content 60 to 65% by weight) are stirred for 15 minutes using a high-speed stirrer at 300–500 rpm. A mixture 1 is obtained.

The pH of 50 g of the emulsion polymer dispersion described in 2.3 is adjusted to 6.9 with ammonia, and this is treated with 9.4 g of a 3.5% solution of a commercial polyacrylic acid thickener (Viscalex® HV 30 from Allied Colloids, pH 8.0) and 0.5 g of a commercial antifoam (BYK® 035). The mixture 2 is obtained. For the preparation of the basecoats according to the invention the mixtures 1 and 2 are mixed for 30 minutes at 800–1000 rpm and the pH is then adjusted to 7.0, if appropriate, using a 25% aqueous ammonia solution. 60 g of a pre-swelled aqueous paste, containing 2% by weight of inorganic sodium-magnesiumphyllosilicate thickener and 2% by weight, based on the weight of the paste, of polypropylene glycol (number average molecular weight=900) are added to this mixture with stirring. The viscosity is then adjusted with deionized water to an efflux time of 16–25 seconds in a DIN No. 4 cup.

3.4 Basecoat composition 4

The basecoat composition 4 is prepared using a method similar to that used for basecoat composition 3, with the sole difference that 50 g of the emulsion dispersion 2 described in 2.4 are used instead of 50 g of the emulsion polymer dispersion 1.

3.5 Basecoat composition 5

30 parts of the polyurethane dispersion (solids content 27%) described in 2.5 are added to 25 parts of the thickener described in 2.2.6 parts of the acrylate resin (solids content 80%) described in 2.2, 0.5 part of dimethylethanolamine (10% in water), 2 parts of a commercially available methanol-etherified melamineformaldehyde resin (solids content 70% in water), 5 parts of a commercially available aluminum pigment paste (aluminum content from 60 to 65%, mean particle diameter 10 µm), 5 parts of butyl glycol and 26.5 parts of water are added with further stirring. After the mixture has been stirred for 30 minutes, its viscosity is adjusted with water to an efflux time of from 16 to 25 s in a DIN No. 4 cup.

4. Topcoat compositions used 4.1 Clearcoat 1

The commercial 2-component clearcoat based on isocyanate-crosslinked hydroxyl-containing acrylates (AF 23–0185 plus SC 29–0173 plus SV 41–0391 from BASF Lacke+Farben AG, München; mixing ratio 2: 1: 0.6) is used.

4.2 Clearcoat 2

A commercial, highly thinned 2-component clearcoat 2 is used which differs from clearcoat 1 only by the mixing ratio of the components. The mixing ratio of clearcoat 2 is 2:1:27.

EXAMPLES 1 TO 4

The areas of damage 1 and 2 described in 1 are resprayed (SATA jet spray gun, nozzle width 1.4 mm, spray pressure 4 bar) beyond the body-filled area into the abraded clearcoat of the original finish (in a strip at least 1 cm wide around the area of damage) with the aqueous coating materials 2.1 to 2.4. A just continuous paint film of low thickness is to be produced. The measured dry film thicknesses of this coat were 5 µm. The coating materials were dried under the conditions stated in Table 1. The aqueous basecoat compositions 3.1 to 3.4 are then sprayed on (SATA jet spray gun, nozzle width 1.4 mm, spray pressure 2–3 bar). These water-thinnable metallic basecoats are applied to the area of damage in such a way that they hide the latter (dry film thickness 15 µm), and are applied to the adjacent area presprayed with the aqueous coating material by the tapering-off spray technique. Overlapping of the unpretreated original finish by the basecoat must be avoided in order to avoid marking in the region of the edge zone by altered orientation of the metallic pigments. After a brief flash-off time of 60 min. in the case of basecoat compositions 1 and 2 and 30 min. in the case of basecoat compositions 3 and 4 the clearcoat is applied to the entire refinish area and beyond the region of the applied aqueous coating material using the tapering-off spray technique into the region of the unpretreated original finish. Applying the clearcoat beyond the region of the basecoat into the adjacent parts achieves a uniform surface structure, so that costly polishing work at the area of damage is no longer necessary. In this operation the clearcoat is applied in the region of the area of damage at a dry film thickness of 60 µm. After a brief flash-off time of 5 min. the topcoat is then dried at 60° C. for 30 min. The resulting coat structure in each case and its application properties are listed in Table 1. After suitable drying of the aqueous coating material an outstanding repair of the area of damage is obtained in all cases. No shade changes, no alterations of the metallic effect, no clouding and no similar phenomena were observed especially in the edge zone region (both at the boundary between the refinish body filler and the original finish and at the boundary between the basecoat and the aqueous coating material from the first process stage). The shade match with the original finish is very good, and furthermore there are no problems regarding adhesion between the original finish and the refinish paint system.

Comparison Examples 1 to 3

Methods similar to those used in Examples 1 to 4 are used, with the sole difference that no aqueous coating material is applied but the basecoat is applied directly to the prepared (body-filled) area of damage and to the adjacent regions. In all cases only an inadequate repair of the area of damage was possible, since shade changes and in particular effect alterations occurred especially in the transition region between basecoat and original finish.

The resulting coat structure in each case and its application properties are listed in Table 2.

Comparison Examples 4 and 5

Methods similar to those used in Examples 1 to 4 are used, with the sole difference that the conventional, highly thinned clearcoat 2 is applied beyond the area of damage instead of the aqueous coating material under otherwise identical conditions. Here, too, only an inadequate repair of the area of damage was possible. The resulting coat structure in each case and its application properties are listed in Table 2.

EXAMPLES 5 AND 6

Methods similar to those used in Examples 1 to 4 are used, with the sole difference that coating material 2.5 and basecoat 3.5 are now employed in each case.

The layer structure resulting in each case and the applicational properties thereof are shown in Table 3. In all cases, excellent refinishing of the damaged area is obtained after suitable drying of the aqueous coating material. Especially in the transition region (both at the boundary between the repair filler and the original finish and at the boundary between the basecoat and the aqueous coating material in the first process step), no changes in shade, changes in the metallic effect, cloud formation, and the like are observed. Shade matching to the original finish is very good, and in addition there are no adhesion problems between the original finish and the refinish.

TABLE 1

| Example | 1 | 2 | 3 | 4 |
| --- | --- | --- | --- | --- |
| Area of damage | 1 | 1 | 2 | 2 |
| Coating material[1] | 2.1 or 2.2 | 2.3 or 1.4 | 2.1 or 2.2 | 2.3 or 2.4 |
| Basecoat[2] | 3.1 to 3.4 | 3.1 to 3.4 | 3.1 to 3.4 | 3.1 to 3.4 |
| Clearcoat[3] | 4.1 | 4.1 | 4.1 | 4.1 |
| Transition body-filler/orig. finish[4] | pass | pass | pass | pass |
| Edge zone basecoat/coating material[5] | | | | |
| A | pass | pass | pass | pass |
| B | fail | pass | fail | pass |

Notes on Table 1
[1] the aqueous coating material used in each case
[2] the aqueous basecoat composition used in each case
[3] the topcoat composition used in each case
[4] transition body filler/original finish both after drying of the aqueous coating material for 10 min. at 80° C. and after drying of the aqueous coating material for 10 min. at 20° C.: pass = no markings, no clouding or similar phenomena
[5] transition basecoat composition/aqueous coating material after different methods of drying the aqueous coating material:
A: drying for 10 min. at 80° C.
B: drying for 10 min. at 20° C.
pass = no marking, no clouding or similar phenomena
fail = marking of the edge zone, clouding or similar phenomena

TABLE 2

| | C1 | C2 | C3 | C4 | C5 |
| --- | --- | --- | --- | --- | --- |
| Area of damage | 1 | 2 | 2 | 1 | 2 |
| Coating material[1] | — | — | — | 4.2 | 4.2 |
| Basecoat[2] | 3.1 to 3.4 | 3.1 or 3.2 | 3.3 or 3.4 | 3.1 to 3.4 | 3.1 to 3.4 |

TABLE 2-continued

| | C1 | C2 | C3 | C4 | C5 |
| --- | --- | --- | --- | --- | --- |
| Clearcoat[3] | 4.1 | 4.1 | 4.1 | 4.1 | 4.1 |
| Transition body-filler/orig. finish[4] | pass | fail | pass | pass | pass |
| Edge zone basecoat/coating material[5] | fail | fail | fail | fail | fail |

Notes on Table 2
[1] the aqueous coating material used in each case
[2] the aqueous basecoat composition used in each case
[3] the topcoat composition used in each case
[4] transition body filler/original finish: pass = no marking, no clouding or similar phenomena; fail = marking of the edge zone, clouding or similar phenomena.
[5] transition basecoat composition/original finish for Comparison Examples 1 to 3 and transition basecoat composition/coating material 4.2 for Comparison Examples 4 and 5:
pass = marking, no clouding or similar phenomena
fail = marking of the edge zone, clouding or similar phenomena

TABLE 3

| Example | 5 | 6 |
| --- | --- | --- |
| Area of damage | 1 | 2 |
| Coating material[1] | 2.5 | 2.5 |
| Basecoat[2] | 3.5 | 3.5 |
| Clearcoat[3] | 4.1 | 4.1 |
| Transition body filler/orig. finish[4] | pass | pass |
| Edge zone basecoat/coating material[5] | | |
| A | pass | pass |
| B | fail | fail |

Notes on Table 3
[1] the aqueous coating material used in each case
[2] the aqueous basecoat composition used in each case
[3] the topcoat composition used in each case
[4] transition body filler/original finish both after drying of the aqueous coating material for 10 minutes at 80° C. and after drying the aqueous coating material for 10 minutes at 20° C.: pass = no marking, clouding or similar phenomena
[5] transition basecoat composition/aqueous coating material after various drying of the aqueous coating material:
A: drying for 10 minutes at 80° C.
B: drying for 10 minutes at 20° C.
pass = no marking, clouding or similar phenomena
fail = marking of the edge zone, clouding or similar phenomena

I claim:
1. A multicoat refinishing process for repairing an area of damage of an original finish, in which
A) the area of damage is prepared for the application of a refinish paint system by cleaning, sanding, and, if necessary, applying a surfacer and/or body filler,
B) a first coating material is applied to the prepared area of damage and to an adjacent original finish area,
C) a first coating film, having a dry film thickness of between 2 and 50 μm in the area of damage, is formed from the first coating material,
D) an aqueous basecoat composition containing metallic and/or special-effect pigments is applied to the first coating film at such a thickness that the basecoat composition hides the area of damage and has a dry film thickness that gradually diminishes outwards from the edge of the area of damage to 0 μm within the adjacent region of the original finish coated with the first coating film,
E) a basecoat film is formed from the basecoat composition,
F) a transparent topcoat composition is applied to the basecoat film, and then

G) a topcoat film is formed from the topcoat composition and the topcoat, basecoat, and first coating layers are dried together at a temperature between room temperature and 100° C., wherein I) the first coating material is aqueous and comprises
   a) 5 to 50% by weight, based on the total weight of the coating material, of at least one water-thinnable or water-dispersible film-forming material,
   b) 0 to 20% by weight, based on the total weight of the coating material, of at least one organic solvent, and wherein the first coating material and/or the basecoat compositions contain resins selected from the group consisting of polyurethane resins, emulsion polymers obtained by
   (a) polymerizing in the first stage 10 to 90 parts by weight of an ethylenically unsaturated monomer or a mixture of ethylenically unsaturated monomers in aqueous phase in the presence of one or more emulsifiers and one or more radical-forming initiators, the ethylenically unsaturated monomer or the mixture of ethylenically unsaturated monomers being chosen so that in the first stage a polymer is obtained having a glass transition temperature ($T_{G1}$) of +30° to +110° C., and,
   (b) after at least 80% by weight of the ethylenically unsaturated monomer or monomer mixture used in the first stage has reacted, polymerizing in a second stage 90 to 10 parts by weight of an ethylenically unsaturated monomer or a mixture of ethylenically unsaturated monomers in the presence of the polymer obtained in the first stage, the monomer used in the second stage or the mixture of ethylenically unsaturated monomers used in the second stage being chosen so that a sole polymerization of the monomer used in the second stage or of the mixture of ethylenically unsaturated monomers used in the second stage furnishes a polymer having a glass transition temperature ($T_{G2}$) of −60° to +20° C., and the reaction conditions being chosen so that the resultant emulsion polymer had a number average molecular weight of 200,00 to 2,000,000, and the ethylenically unsaturated monomer or mixture of monomers used in the first stage and those of the ethylenically unsaturated monomer or mixture of monomers used in the second stage being chosen so that the resultant emulsion polymer has a hydroxyl value of 2 to 100 and the difference ($T_{G1}$)−($T_{G2}$) is 10° to 170° C.

2. The process as claimed in claim 1, wherein the first coating film has a dry film thickness in the area of original finish that gradually diminishes outwards from the edge of the area of damage to 0 μm.

3. The process as claimed in claim 2, wherein the dry film thickness of the first coating film diminishes to a dry film thickness of 0 μm in a region of the original finish between 1 cm and 1 m wide.

4. The process as claimed in claim 1, wherein the transparent topcoat film has a dry film thickness in the adjacent region of the original finish that gradually diminishes outwards from the edge of the area of damage to 0 μm.

5. The process as claimed in claim 1, wherein the transparent topcoat composition is applied extending into the adjacent region of the original finish until a boundary of the original finish is reached.

6. The process as claimed in claim 1, wherein the first coating material and/or the basecoat composition contain as the film-forming material an emulsion polymer obtained by (a) polymerizing in a first stage 10 to 90 parts by weight of an ethylenically unsaturated monomer or a mixture of ethylenically unsaturated monomers in aqueous phase in the presence of one or more emulsifiers and one or more radical-forming initiators, the ethylenically unsaturated monomer or the mixture of ethylenically unsaturated monomers being chosen so that in the first stage a polymer is obtained having a glass transition temperature ($T_{G1}$) of +30° to 110° C., and, (b) after at least 80% by weight of the ethylenically unsaturated monomer or monomer mixture used in the first stage has reacted, polymerizing in a second stage 90 to 10 parts by weight of an ethylenically unsaturated monomer or a mixture of ethylenically unsaturated monomers in the presence of the polymer obtained in the first stage, the monomer used in the second stage or the mixture of ethylenically unsaturated monomers used in the second stage being chosen so that a sole polymerization of the monomer used in the second stage or of the mixture of ethylenically unsaturated monomers used in the second stage furnishes a polymer having a glass transition temperature ($T_{G2}$) of −60° to +20° C., and the reaction conditions being chosen so that the resultant emulsion polymer has a number average molecular weight of 200,000 to 2,000,000, the ethylenically unsaturated monomer or mixture of monomers used in the first stage and those of the ethylenically unsaturated monomer or mixture of monomers used in the second stage being chosen so that the resultant emulsion polymer has a hydroxyl value of 2 to 100 and the difference $T_{G1}$−$T_{G2}$ is 10° to 170° C.

7. The process as claimed in claim 6, wherein the first coating material and/or the basecoat composition contains as the film-forming material a mixture consisting of at least 40% by weight of the emulsion polymer and up to 60% by weight of a water-thinnable polyurethane resin, the amounts in each case being based on the solids content and their sum always being 100% by weight.

8. The process as claimed in claim 1, wherein the first coating material and/or the basecoat composition contain as the film-forming material a water-thinnable or water-dispersible polyurethane resin.

9. The process as claimed in claim 1, wherein the area of damage is prepared by applying an aqueous surfacer and/or body filler.

10. A multicoat refinishing process for repairing an area of damage of an original finish, wherein
   A) the area of damage is prepared for the application of a refinish paint system by cleaning, sanding, and, if necessary, applying a surfacer and/or body filler,
   B) a first coating material is applied to the prepared area of damage and to adjacent original finish areas until a boundary of the original finish is reached,
   C) a first coating film, having a dry film thickness of between 2 and 50 μm in the area of damage, is formed from the first coating material,
   D) a basecoat composition containing metallic and/or special-effect pigments is applied to the first coating film,
   E) a basecoat film is formed from the basecoat composition,
   F) a transparent topcoat composition is applied to the basecoat film, and then
   G) a topcoat film is formed from the topcoat composition and the topcoat, basecoat, and first coating layers are dried together at a temperature between room temperature and 140° C., wherein I) the first coating material is aqueous and comprises
   a) 5 to 50% by weight, based on the total weight of the coating material, of at least one water-thinnable or water-dispersible film-former,
   b) 0 to 20% by weight, based on the total weight of the coating material, of at least one organic solvent, and II) the basecoat composition is aqueous.

11. The process as claimed in claim 10, wherein the aqueous first coating material contains coloring pigments, except metallic and special-effect pigments.

12. The process as claimed in claim 10, wherein the first coating material and/or the basecoat composition contain as the film-forming material an emulsion polymer obtained by
   (a) polymerizing in the first stage 10 to 90 parts by weight of an ethylenically unsaturated monomer or a mixture of ethylenically unsaturated monomers in aqueous phase in the presence of one or more emulsifiers and one or more radical-forming initiators, the ethylenically unsaturated monomer or the mixture of ethylenically unsaturated monomers being chosen so that in the first stage a polymer is obtained having a glass transition temperature ($T_{G1}$) of +30° to 110° C., and,
   (b) after at least 80% by weight of the ethylenically unsaturated monomer or monomer mixture used in the first stage has reacted, polymerizing in a second stage 90 to 10 parts by weight of an ethylenically unsaturated monomer or a mixture of ethylenically unsaturated monomers in the presence of the polymer obtained in the first stage, the monomer used in the second stage or the mixture of ethylenically unsaturated monomers used in the second stage being chosen so that a sole polymerization of the monomer used in the second stage or of the mixture of ethylenically unsaturated monomers used in the second stage furnishes a polymer having a glass transition temperature ($T_{G2}$) of −60° to +20° C., and the reaction conditions being chosen so that the resultant emulsion polymer has a number average molecular weight of 200,000 to 2,000,000, the ethylenically unsaturated monomer or mixture of monomers used in the first stage and those of the ethylenically unsaturated monomer or mixture of monomers used in the second stage being chosen so that the resultant emulsion polymer has a hydroxyl value of 2 to 100 and the difference $T_{G1}-T_{G2}$ is 10° to 170° C.

13. The process as claimed in claim 2, wherein the first coating material and/or the basecoat composition contains as the film-forming material a mixture consisting of at least 40% by weight of the emulsion polymer and up to 60% by weight of a water-thinnable polyurethane resin, the amounts in each case being based on the solids content and their sum always being 100% by weight.

14. The process as claimed in claim 10, wherein the first coating material and/or the basecoat composition contain as the film-forming material a water-thinnable or water-dispersible polyurethane resin.

15. The process as claimed in claim 10, wherein the area of damage is prepared by applying an aqueous surfacer and/or body filler.

16. A multicoat refinishing process for repairing an area of damage of an original finish, wherein A) the area of damage is prepared for the application of a refinish paint system by cleaning, sanding, and, if necessary, applying a surfacer and/or body filler, B) a first coating material is applied to the prepared area of damage and to adjacent original finish areas until a boundary of the original finish is reached, C) a first coating film, having a dry film thickness of between 2 and 50 μm in the area of damage, is formed from the first coating material, D) an aqueous basecoat composition containing metallic and/or special-effect pigments is applied to the first coating film, E) a basecoat film is formed from the basecoat composition, F) a transparent topcoat composition is applied to the basecoat film, and then G) a topcoat film is formed from the topcoat composition and the topcoat, basecoat, and first coating layers are dried together at a temperature between room temperature and 140° C., wherein I) the first coating material is aqueous and comprises
   a) 5 to 50% by weight, based on the total weight of the coating material, of at least one water-thinnable or water-dispersible film-former,
   b) 0 to 20% by weight, based on the total weight of the coating material, of at least one organic solvent, and wherein the first coating material and/or the basecoat compositions contain water-dispersible film-formers comprising emulsion polymers obtained by
   (a) polymerizing in the first stage 10 to 90 parts by weight of an ethylenically unsaturated monomer or a mixture of ethylenically unsaturated monomers in aqueous phase in the presence of one or more emulsifiers and one or more radical-forming initiators, the ethylenically unsaturated monomer or the mixture of ethylenically unsaturated monomers being chosen so that in the first stage a polymer is obtained having a glass transition temperature ($T_{G1}$) of +30° to +110° C., and,
   (b) after at least 80% by weight of the ethylenically unsaturated monomer or monomer mixture used in the first stage has reacted, polymerizing in a second stage 90 to 10 parts by weight of an ethylenically unsaturated monomer or a mixture of ethylenically unsaturated monomers in the presence of the polymer obtained in the first stage, the monomer used in the second stage or the mixture of ethylenically unsaturated monomers used in the second stage being chosen so that a sole polymerization of the monomer used in the second stage or of the mixture of ethylenically unsaturated monomers used in the second stage furnishes a polymer having a glass transition temperature ($T_{G2}$) of −60° to +20° C., and the reaction conditions being chosen so that the resultant emulsion polymer had a number average molecular weight of 200,00 to 2,000,000, and the ethylenically unsaturated monomer or mixture of monomers used in the first stage and those of the ethylenically unsaturated monomer or mixture of monomers used in the second stage being chosen so that the resultant emulsion polymer has a hydroxyl value of 2 to 100 and the difference ($T_{G1}$)−($T_{G2}$) is 10° to 170° C., and mixtures of polyurethane polymers and said emulsion polymers.

17. The process as claimed in claim 16, wherein the basecoat composition applied in step D) containing metallic and/or special-effect pigments is applied to the first coating film at such a thickness that the basecoat composition hides the area of damage and has a dry film thickness that gradually diminishes outwards from the edge of the area of damage to 0 µm within the adjacent region of the original finish coated with the first coating film.

18. The process as claimed in claim 16, wherein the first coating material and/or the basecoat composition contains as the film-forming material a mixture consisting of at least 40% by weight of the emulsion polymer and up to 60% by weight of a water-thinnable polyurethane resin, the amounts in each case being based on the solids content and their sum always being 100% by weight.

19. The process as claimed in claim 17, wherein the first coating material and/or the basecoat composition contains as the film-forming material a mixture consisting of at least 40% by weight of the emulsion polymer and up to 60% by weight of a water-thinnable polyurethane resin, the amounts in each case being based on the solids content and their sum always being 100% by weight.

* * * * *